United States Patent
Huang et al.

(10) Patent No.: US 8,649,255 B2
(45) Date of Patent: Feb. 11, 2014

(54) DEVICE AND METHOD FOR FAST FOURIER TRANSFORM

(75) Inventors: Zhi Huang, Shenzhen (CN); Daibing Zeng, Shenzhen (CN); Xiaolei Sun, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 104 days.

(21) Appl. No.: 13/258,485

(22) PCT Filed: Apr. 13, 2010

(86) PCT No.: PCT/CN2010/071747
§ 371 (c)(1),
(2), (4) Date: Sep. 22, 2011

(87) PCT Pub. No.: WO2010/118682
PCT Pub. Date: Oct. 21, 2010

(65) Prior Publication Data
US 2012/0020201 A1     Jan. 26, 2012

(30) Foreign Application Priority Data
Apr. 13, 2009    (CN) .......................... 2009 1 0133655

(51) Int. Cl.
G06F 17/14    (2006.01)
(52) U.S. Cl.
USPC .............................. 370/210; 370/208; 708/403
(58) Field of Classification Search
None
See application file for complete search history.

(56) References Cited

U.S. PATENT DOCUMENTS

| | | | |
|---|---|---|---|
| 7,403,881 B2 * | 7/2008 | Magee et al. | 703/2 |
| 7,552,161 B2 | 6/2009 | Schwoerer et al. | |
| 7,676,532 B1 * | 3/2010 | Liu et al. | 708/400 |
| 8,271,569 B2 * | 9/2012 | Mundarath et al. | 708/405 |
| 8,364,736 B2 * | 1/2013 | Lee et al. | 708/404 |
| 2007/0201354 A1 * | 8/2007 | Oh et al. | 370/210 |
| 2007/0288542 A1 | 12/2007 | Shih | |

FOREIGN PATENT DOCUMENTS

| | | |
|---|---|---|
| CN | 101069398 A | 11/2007 |
| CN | 101258488 A | 9/2008 |

OTHER PUBLICATIONS

International Search Report for PCT/CN2010/071747 English translation attached to original both completed by the Chinese Patent Office on Jul. 6, 2010, All together 4 Pages.
International Preliminary Report on Patentability for PCT/Cn2010/071747 dated Oct. 18, 2011.

* cited by examiner

*Primary Examiner* — Anh-Vu Ly
*Assistant Examiner* — Amy Ling
(74) *Attorney, Agent, or Firm* — Brooks Kushman P.C.

(57) ABSTRACT

A device and a method for Fast Fourier Transform (FFT) are disclosed. The device includes a data receiving module, an address translation module, a data storage module, a FFT module, a data extraction module and a data output module. The data receiving module is configured to receive the input data. The address translation module is configured to duplicate M/N copies of the received data and then send them to the data storage module. The data storage module is configured to store the received data sent by the address translation module to M/N different addresses. The FFT module is configured to perform M-point FFT on the stored data. The data extraction module is configured to extract one point in every several points of the transformed data, and send the extracted data to the data output module. The data output module is configured to output the received data.

10 Claims, 2 Drawing Sheets

DEVICE AND METHOD FOR FAST FOURIER TRANSFORM

CROSS-REFERENCE TO RELATED APPLICATION

This application is the U.S. national phase of PCT Application No. PCT/CN2010/071747 filed Apr. 13, 2010 which claims priority to Chinese Application 200910133655.5 filed Apr. 13, 2009, the disclosures of which are incorporated in their entirety by reference herein.

TECHNICAL FIELD

The present invention relates to communication technology, and specifically, to a device and method for Fast Fourier Transform (FFT).

BACKGROUND OF THE RELATED TECHNOLOGY

STiMi, a wireless channel transmission technology oriented to the mobile multimedia broadcasting design, and it is the core in the structure of the China Mobile Multimedia Broadcasting (CMMB) system independently developed by China. STiMi technology fully considers the characteristics of mobile multimedia broadcasting services and uses the most advanced channel error correction coding and orthogonal frequency division multiplexing (OFDM) to improve the anti-interference capability and the support for mobility, in accordance with the high requirement for receiving sensitivity, mobility and battery supply of hand-held devices.

The basic principle of the OFDM is to transform the high-speed serial data into multi-channel relatively low-speed parallel data and to modulate different carriers. The parallel transmission mechanism extremely extends the pulse width of symbols as well as improves the anti-multipath-fading performance. Meanwhile, the spectra in different subcarriers are overlapped, but the spectra are orthogonal with each other in a whole symbol period, which not only guarantees that the signal can be recovered without distortion at the receiving end, but also largely improves the spectrum utilization rate.

In the OFDM system, the receiver needs to perform frame synchronization capture and OFDM symbol synchronization capture, and then can carry out demodulation correctly. STiMi technology creatively uses the time-domain spread spectrum beacon for the synchronization capture, which has features such as short synchronization capture time, strong anti-carrier frequency offset and anti-channel multi-path delay extension capabilities. This method largely reduces the synchronization time needed from the user starting up the receiver to normal reception. Especially in the situations of emergent broadcasting, this method guarantees that the user can carry out reception rapidly and reliably.

The time domain and frequency domain responses of the wireless channel are time-varying, and the frequency domain selective fading introduced by multi-path is also inconsistent in different subcarriers, thus OFDM symbols might be unevenly distorted in different subcarriers. Therefore, the method of channel estimation must be used to estimate the time domain and frequency domain responses of the channels, so as to correct and recover the received data. STiMi uses the pilot technology, which not only guarantees reliable channel estimation and equalization in complicated wireless transmission conditions, but also decreases the hardware complexity of the demodulation module, thus it is beneficial to the chip implementation.

In order to conveniently synchronize the receiver, the CMMB mobile TV standards specifically design a sync signal. The subcarrier interval of the sync signal is 4.8828125 kHz, which is two times of that of the data signal. It is composed of a PN sequence in frequency domain, and two identical signal segments in time domain.

Fractional frequency offset might cause the interference among the OFDM subcarriers, and after it is corrected, the interference between the adjacent subcarriers caused by it is basically eliminated, and the OFDM multi-carrier signal can be correctly demodulated. Compared with the demodulation result after the frequency synchronization, the demodulation result at this time has an even-numbered offset of subcarriers, called integer frequency offset. The integer frequency offset uses the good correlation property of the PN sequence to estimate in frequency domain.

Since the integer frequency offset ($n*\Delta f$) will result in periodically cyclical shift n of the subcarrier symbol data sequence after the FFT operation, the data cannot be demodulated correctly, thus it needs to estimate and then to compensate; the integer frequency offset estimation is implemented by estimating the cyclical shift amount k of the synchronization symbol data sequence after the FFT operation, meanwhile, in order to guarantee the orthogonality between the subcarriers in the processing process of the FFT operation, it needs to carry out fractional frequency offset compensation processing for data before the FFT. In the following, synchronization symbol is used to carry out the integer frequency offset estimation.

The frequency offset estimation module mainly estimates the fractional frequency offset for the synchronization data, and performs FFT operation on the data on the basis of the fractional frequency offset compensation, and then carries out the integer frequency offset estimation for the data. The main sub-modules included are: the initialization synchronization differential sequence module, the initialization trigonometric function table, the fractional frequency offset estimation, the fractional frequency offset compensation, the FFT operation and the integer frequency offset estimation.

In general conditions, the frequency offset estimation module uses software or hardware to implement 2048-point FFT. The CMMB protocol specifies, however, that each OFDM symbol comprises 4096 sample points, therefore a 4096-point FFT needs to be performed. During the implementation, generally both FFTs are respectively performed, as shown in FIG. 1. This method needs two FFT modules, which causes resource waste and has low utilization rate, meanwhile, it might increase difficulty in digital signal processing (DSP) or software control, and also consume the number of the cycles.

SUMMARY OF THE INVENTION

The technical problem to be solved by the present invention is to provide a device and method for Fast Fourier Transform (FFT) to improve the resource utilization rate and provide better precision control.

In order to solve the above problems, the present invention provides a method for FFT, including: duplicating M/N copies of the input data and storing the M/N copies into M/N different addresses, then performing M-point FFT on the stored data, and extracting one point in every several points in the transformed data and outputting the extracted data, and said M is the maximum number of points in the FFT, and N is the practical number of points in the input data, to implement the multiplexing of the FFT.

Before the storing step, the method also includes: judging whether performing the M-point FFT for the input data at first, and if yes, performing the M-point FFT on the input data directly and outputting the transformed data, otherwise, carrying out said storing step.

When M=2N, the step of duplicating two copies of the input data and storing the two copies into two different addresses is: duplicating two copies of the $i^{th}$ data and storing the two copies into the addresses i and N+i respectively; where $0 \le i \le N-1$.

When M=4N, the step of duplicating four copies of the input data and storing the four copies into four different addresses is: duplicating four copies of the $i^{th}$ data and storing the four copies into the addresses i, N+i, 2N+i, and 3N+i respectively, where $0 \le i \le N-1$.

In the step of extracting one point in every several points in the transformed data, extract the $(2i)^{th}$ data or the $(2i+1)^{th}$ data, where $0 \le i \le N-1$.

In the step of extracting one point in every several points in the transformed data, extract the $(4i)^{th}$ data, or the $(4i+1)^{th}$ data, or the $(4i+2)^{th}$ data or the $(4i+3)^{th}$ data, where $0 \le i \le N-1$.

The present invention also provides a device for Fast Fourier Transform (FFT), and the device comprises a data receiving module, a data storage module, a FFT module, and a data output module; said device also comprises an address translation module and a data extraction module;

said data receiving module is configured to: receive input data;

said address translation module is configured to: duplicate M/N copies of the received data and sending the copies to the data storage module;

said data storage module is configured to: store the received data sent from the address translation module into M/N different addresses;

said FFT module is configured to: perform M-point FFT on the stored data;

said data extraction module is configured to: extract one point in every several points in the transformed data and sending the extracted data to the data output module;

said data output module is configured to: output the received data;

said M is the maximum number of points in the FFT, and N is the practical number of points in the input data;

thereby implementing the multiplexing of the FFT.

Said device also comprises a judgment module, and said judgment module is configured to: after receiving the data sent from the data receiving module, judge whether to perform M-point FFT or not, and if yes, send the data to the storing module, otherwise, send the data to the address translation module.

Said data storage module is configured to: when M=2N, store the two copies of the $i^{th}$ data to the addresses i and N+i respectively after duplication; where $0 \le i \le N-1$;

or, said data storage module is configured to: when M=4N, store the four copies of the $i^{th}$ data to the addresses i, N+i, 2N+i, and 3N+i respectively after duplication; where $0 \le i \le N-1$.

Said data extraction module is configured to: when M=2N, extract the $(2i)^{th}$ data or the $(2i+1)^{th}$ data, where $0 \le i \le N-1$;

or, said data extraction module is configured to: when M=4N, extract the $(4i)^{th}$ data, or the $(4i+1)^{th}$ data, or the $(4i+2)^{th}$ data or the $(4i+3)^{th}$ data, where $0 \le i \le N-1$.

To sum up, the present invention provides a device and method for FFT so as to provide better precision control and reduce hardware resource or DSP algorithm burden.

PREFERRED EMBODIMENTS OF THE PRESENT INVENTION

The present invention provides a multiplexing device and method for FFT, and duplicate M/N copies of the input data and store the M/N copies into M/N different addresses, and perform M-point FFT on the stored data, after the FFT, extract one point in every several points in the data and output the extracted data, where M is the maximum number of points in FFT, and N is the practical number of points in the input data.

Figure 1:
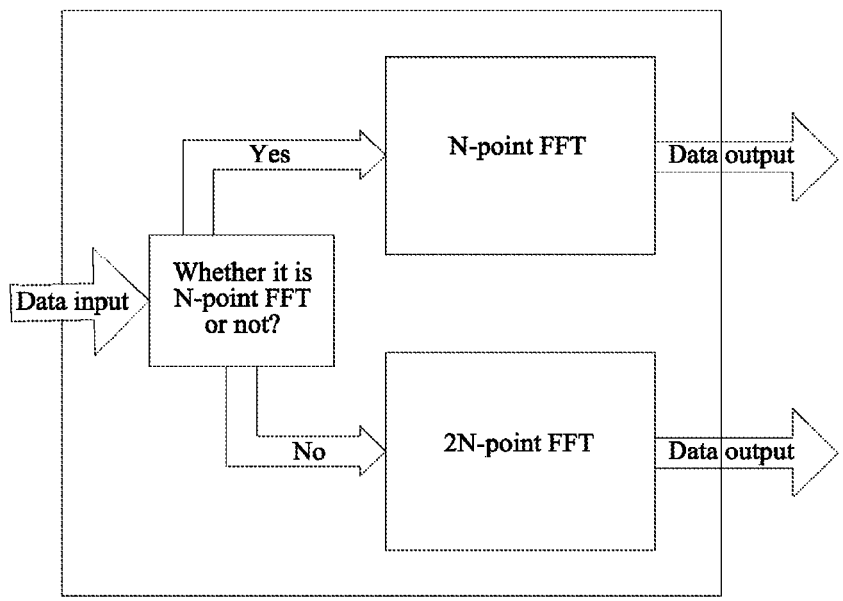
FIG. 1 is a circuit block diagram to implement two FFTs respectively in some embodiments.
Figure 2:
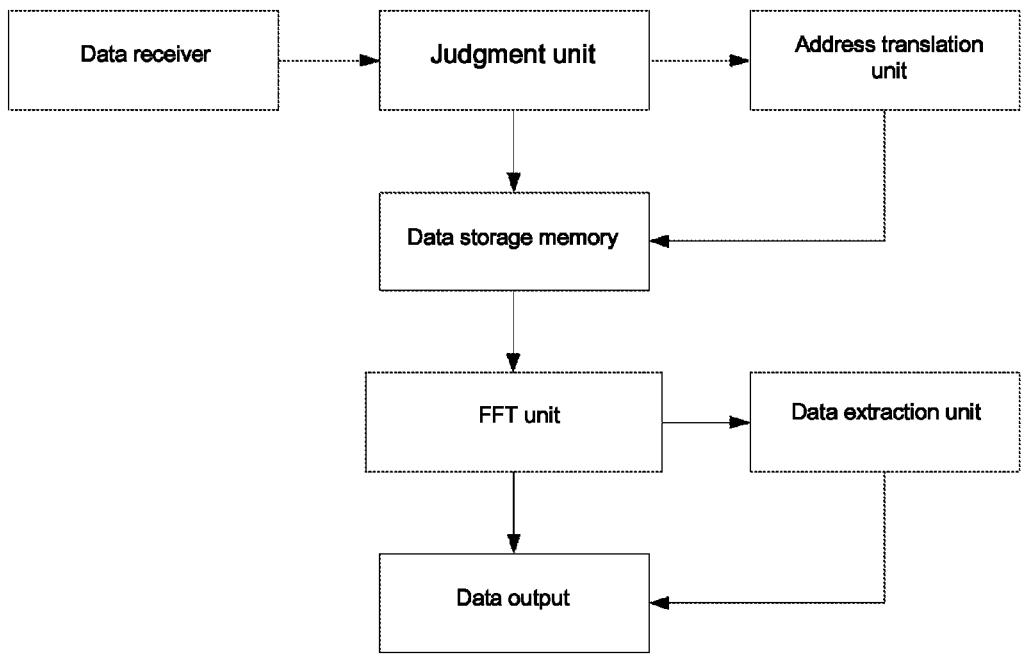
FIG. 2 is a multiplexing device for implementing N-point FFT and M-point FFT in the present invention.

This example provides a multiplexing device for FFT, and as shown in FIG. 2, the device comprises a data receiving module, a judgment module, an address translation module, a data storage module, a Fast Fourier Transform (FFT) module, a data extraction module and a data output module;

The data receiving module is used to receive the input data and send it to the judgment module;

The judgment module is used to receive the data sent from the data receiving module, and judge whether to perform M-point FFT on the data or not, and if yes, send the data to the storage module, otherwise, send the data to the address translation module;

Specifically, when it needs to multiplex the N-point FFT and the 2N-point FFT, and the maximum number of points is M=2N, send the received data for which N-point FFT is carried out to the address translation module, and send the received data for which 2N-point FFT is carried out to the data storage module;

when it needs to multiplex the N-point FFT and the 4N-point FFT, and the maximum number of points is M=4N, send the received data for which N-point FFT is carried out to the address translation module, and send the received data for which 4N-point FFT is carried out to the data storage module;

when it needs to multiplex the N-point FFT, the 2N-point FFT and the 4N-point FFT, the maximum number of points is M=4N, send the received data for which N-point FFT is carried out as well as 2N-point FFT is carried out to the address translation module, and send the received data for which 4N-point FFT is carried out to the data storage module.

The address translation module is used to duplicate M/N copies of the received data and send the M/N copies to the data storage module;

specifically, when it needs to multiplex the N-point FFT and the 2N-point FFT, duplicate two copies of the received data for which N-point FFT is carried out and send the two copies to the data storage module;

when it needs to multiplex the N-point FFT and the 4N-point FFT, duplicate four copies of the received data for which N-point FFT is carried out and send the four copies to the data storage module;

when it needs to multiplex the N-point FFT, the 2N-point FFT and the 4N-point FFT, duplicate four copies of the received data for which N-point FFT is carried out and send the four copies to the data storage module, and duplicate two copies of the data for which 2N-point FFT is carried out and send the two copies to the data storage module.

The data storage module is used to store the data sent from the address translation module into M/N different addresses;

specifically, when M=2N, the data storage module receives the data sent from the address translation module and stores it to two different address, such as storing the two copies of the $i^{th}$ data to the addresses i and N+i respectively after duplication;

when M=4N, the data storage module receives the data sent from the address translation module and stores it to four different addresses, such as storing the four copies of the $i^{th}$ data to the address i, the address N+i, the address 2N+i, and the address 3N+i respectively after duplication; where $0 \leq i \leq N-1$.

The data storage module is also used to store the data sent from the judgment module, and the method for storage is the same as that in some embodiments.

The FFT module is used to perform M-point FFT on the stored data; as well as to send the transformed data to the data extraction module when N-point FFT is carried out for the input data, and send the transformed data to the data output module when M-point FFT is carried out for the input data;

the data extraction module is used to extract one point in every several points in the received data; as well as send the extracted data to the data output module;

extracting one point in every several points in the data specifically means that: when M=2N, extracting the $(2i)^{th}$ data or the $(2i+1)^{th}$ data; when M=4N, extracting the $(4i)^{th}$ data, the $(4i+1)^{th}$ data, the $(4i+2)^{th}$ data or the $(4i+3)^{th}$ data; where $0 \leq i \leq N-1$.

The data output module is used to output the received data.

Figure 3:
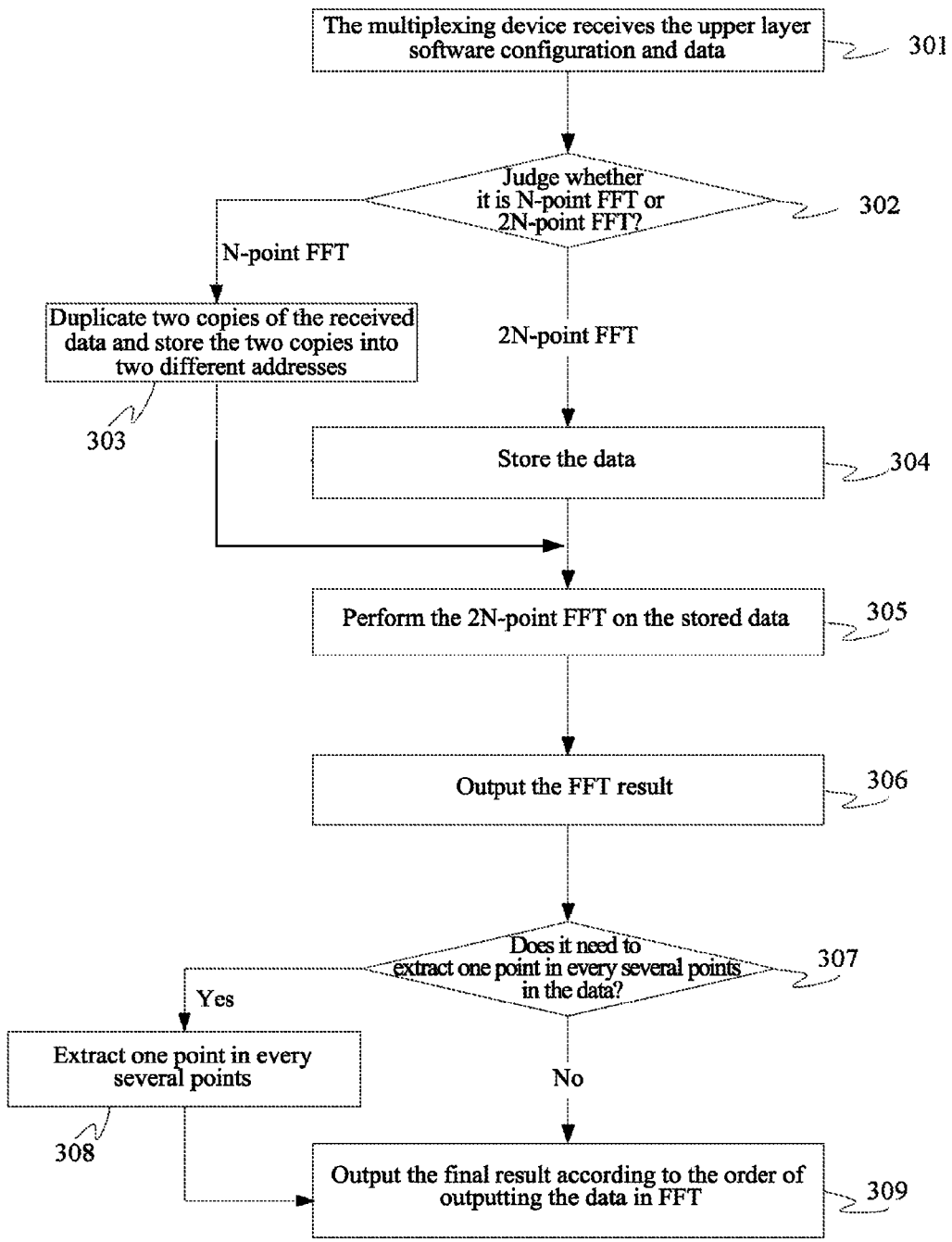
FIG. 3 is a flow chart of the multiplexing method for implementing N-point FFT and 2N-point FFT in the present invention.

The present invention provides a multiplexing method for FFT, and multiplexing the N-point FFT and the 2N-point FFT as well as multiplexing the N-point FFT and the 4N-point FFT are respectively used to describe the method;

when it needs to multiplex the N-point FFT and the 2N-point FFT (that is, M=2N), duplicate the input N-point data to 2N-point data and then perform 2N-point FFT, and then extract one point in every several points in the transformed data to acquire the N-point FFT result, and as shown in FIG. 3, the procedure comprises the following steps:

Step 301: the multiplexing device receives the upper layer software configuration and data;

Step 302: judge whether it is N-point FFT or 2N-point FFT, and if it is the N-point FFT, proceed to step 303, otherwise proceed to step 304;

Step 303: duplicate 2 copies of the received data, and store the two copies to two different addresses, and then proceed to step 305;

the method for storing the duplicated data to two different addresses can be but not limited to: when receiving the $0^{th}$ data, store the duplicated data to the address 0 and the address N, and when receiving the $1^{st}$ data, store the duplicated data to the address 1 and the address N+1, . . . , when receiving the $i^{th}$ data, store the duplicated data to the address i and the address N+i, where $0 \leq i \leq N-1$;

Step 304: store the data and proceed to step 305;

Step 305: perform the 2N-point FFT on the stored data, and the specific transforming method is the same as that in some embodiments;

Step 306: output the FFT result;

Step 307: judge whether it needs to extract one point in every several points in the data or not according to whether it is a N-point FFT or a 2N-point FFT, and if it is the N-point FFT, proceed to step 308, otherwise proceed to step 309;

Step 308: perform the one point in every several points extraction, that is, extract the $(2i)^{th}$ data, or the $(2i+1)^{th}$ data, where $0 \leq i \leq N-1$, and then proceed to step 309;

Step 309: output the final result according to the order of FFT outputting the data.

When it needs to multiplex the N-point FFT and the 4N-point FFT (that is M=4N), duplicate the input N-point data to 4N-point data and then perform the 4N-point FFT on the data, and extract one point in every several points in the transformed data to acquire the N-point FFT result, and the procedure comprises the following steps:

Step 401: the multiplexing device receives the upper layer software configuration and data;

Step 402: judge whether it is N-point FFT or 4N-point FFT, and if it is the N-point FFT, proceed to step 403, otherwise proceed to step 404;

Step 403: duplicate four copies of the received data, and store the four copies into four different addresses, and then proceed to step 405;

The method for storing the duplicated data to four different addresses can be but not limited to: when receiving the $0^{th}$ data, store the duplicated data to the address 0, the address N, the address 2N and the address 3N, when receiving the $1^{st}$ data, store the duplicated data to the address 1, the address N+1, the address 2N+1 and the address 3N+1, . . . , when receiving the $i^{th}$ data, store the duplicated data to the address i, the address N+i, the address 2N+i, and the address 3N+i, where $0 \leq i \leq N-1$;

Step 404: store the data and then proceed to step 405;

Step 405: perform 4N-point FFT on the stored data, and the specific transformation method is the same as that in some embodiments;

Step 406: output the FFT result;

Step 407: judge whether it needs to extract one point in every several points in the data or not according to whether it is N-point FFT or 4N-point FFT, and if it is the N-point FFT, proceed to step 408, otherwise proceed to step 409;

Step 408: extract one point in every several points in the data, that is, extract the $(4i)^{th}$ data, the $(4i+1)^{th}$ data, the 4i+2th data or the 4i+3th data, $0 \leq i \leq N-1$, and then proceed to step 409;

Step 409: output the final result according to the order of FFT outputting the data.

When it needs to multiplex the N-point FFT, the 2N-point FFT and the 4N-point FFT (that is, M=4N), duplicate the input N-point data to 4N-point data according to the above method and then perform the 4N-point FFT on the data, and duplicate the input 2N-point data to 4N-point data and then perform the 4N-point FFT, and then extract one point in every several points in the transformed data to acquire the N-point FFT and 2N-point FFT results respectively, and then directly performs FFT on the input 4N-point data, and the specific operation method is the same as what is mentioned above, thus the specific description is omitted here.

In the following, the present invention will be further illustrated by taking multiplexing the 2048-point FFT and 4096-point FFT for example:

Step 1: the multiplexing device receives the upper layer software configuration and data;

Step 2: judge whether it is 2048-point FFT or 4096-point FFT, and if it is the 4096-point FFT, proceed to step 4, otherwise proceed to step 3;

Step 3: duplicate two copies of the received data and store the copies to two different addresses, and then proceed to step 5;

the method for storing the duplicated data to two different addresses can be but not limited to: when receiving the $0^{th}$ data, store the duplicated data to the address 0 and the address 2048, when receiving the $1^{st}$ data, store the duplicated data to the address 1 and the address 2049, ..., when receiving the $i^{th}$ data, store the duplicated data to the address i and the address 2048+i, where $0\leq i\leq 2047$;

Step 4: store the data and then proceed to step 5;

Step 5: perform 4096-point FFT on the stored data, and the specific transformation method is the same as that in some embodiments;

Performing 4096-point FFT specifically means:

(a) Perform the first order butterfly operation on the 4096 sample points, that is, extract 4 sample points and 3 rotation factors to carry out the butterfly operation at each time, and proceed to step (b) after all 4096 sample points are extracted;

(b) Perform the second order butterfly operation on the 4096 sample points, that is, extract 4 sample points and 3 rotation factors to carry out the butterfly operation at each time, and proceed to step (c) after all 4096 sample points are extracted; the method for extracting the sample points is different from that in step (a);

(c) Perform the third order butterfly operation on the 4096 sample points, that is, extract 4 sample points and 3 rotation factors to carry out the butterfly operation at each time, and proceed to step (d) after all 4096 sample points are extracted; the method for extracting the sample points is different from that in step (a) and (b);

(d) Perform the fourth order butterfly operation on the 4096 sample points, that is, extract 4 sample points and 3 rotation factors to carry out the butterfly operation at each time, and proceed to step (e) after all 4096 sample points are extracted; the method for extracting the sample points is different from that in step (a), (b) and (c);

(e) Perform the fifth order butterfly operation on the 4096 sample points, that is, extract 4 sample points and 3 rotation factors to carry out the butterfly operation at each time, and proceed to step (f) after all 4096 sample points are extracted; the method for extracting the sample points is different from that in step (a), (b), (c) and (d);

(f) Perform the sixth order butterfly operation on the 4096 sample points, that is, extract 4 sample points and 3 rotation factors to carry out the butterfly operation at each time, the FFT is completed after all 4096 sample points are extracted; the method for extracting the sample points is different from that in step (a), (b), (c), (d) and (e);

Step 6: output the FFT result;

Step 7: judge whether it needs to extract one point in every several points in the data or not according to whether it is 2048-point FFT or 4096-point FFT, and if it is the 2048-point FFT, proceed to step 8, otherwise proceed to step 9;

Step 8: extract one point in every several points in the transformed data, that is, extract the $(2i)^{th}$ data or the $(2i+1)^{th}$ data, where $0\leq i\leq 2047$, and then proceed to step 9;

Step 9: Output the final result according to the order of FFT outputting the data.

In this application example, the storage module can be implemented with 4 MEMs that are in two groups. When generating the read-write addresses, the readout addresses of the MEM are generated according to the counting value of the counter within the controller (that is, the addresses of the four sample points that are read by the butterfly operation at each time), and it needs to generate four read addresses at the same time, moreover the read-out data is distributed in four different MEMs to avoid read conflict. It requires carrying out specific storage for the data address. The specific storage algorithm is the same as that in some embodiments.

Since it is able to extract all needed data at the same time, the present invention can complete one butterfly operation in one system clock, thus the FFT operation can be completed in short time, which significantly improves the real time performance of the system; if in order to save the resource, the butterfly operation can be extended to 2 or 4 system clocks or even longer, thus to complete the butterfly processing with assembly line. The present invention is implemented with the base-4 4096-point FFT and the control circuit in project, and it has very good practical effect.

The present invention is suitable to be used in the FFT multiplexing of one and three times of difference between sample points, such as 1024-point FFT and the 2048-point FFT as well as the 1024-point FFT and the 4096-point FFT and so on, and the present invention is suitable for FFT operation of base 2/4/8/16 real and complex number.

Industrial Applicability

The present invention provides a multiplexing device and method for FFT to provide better precision control, and reduce hardware resource or the DSP operation burden.

What is claimed is:

1. A method for Fast Fourier Transform (FFT), the method comprising: duplicating M/N copies of input data and storing the M/N copies into M/N different addresses of a memory, then performing M-point FFT on stored data in a FFT unit, and extracting one point in every several points in transformed data and outputting extracted data, and said M being a maximum number of points in the FFT, N being a practical number of points in the input data, thus to implement multiplexing of the FFT, wherein $M=2^{n+j}$, $N=2^n$, n is a natural number greater than 0, j=0, 1, 2, M and N are integers.

2. The method of claim 1, wherein,
before the storing step, the method also comprises: judging whether to perform the M-point FFT on the input data at first, and if yes, performing the M-point FFT on the input data directly and outputting the transformed data, otherwise, carrying out the storing step.

3. The method of claim 1, wherein, when M=2N, the step of duplicating two copies of the input data and storing the two copies into two different memory addresses is: duplicating two copies of $i^{th}$ data and storing the two copies into the memory addresses i and N+i respectively; wherein i is a natural number, $0\leq i\leq N-1$.

4. The method of claim 1, wherein,
when M=4N, the step of duplicating four copies of the input data and storing the four copies into four different memory addresses is: duplicating four copies of $i^{th}$ data and storing the four copies into the memory addresses i, N+i, 2N+i, and 3N+i respectively, wherein i is a natural number, $0\leq i\leq N-1$.

5. The method of claim 3, wherein,
in the step of extracting one point in every several points in the transformed data, extract $(2i)^{th}$ data or $(2i+1)^{th}$ data, where $0\leq i\leq N-1$.

6. The method of claim 4, wherein,
in the step of extracting one point in every several points in the transformed data, extract $(4i)^{th}$ data, or $(4i+1)^{th}$ data, or $(4i+2)^{th}$ data or $(4i+3)^{th}$ data, where $0\leq i\leq N-1$.

7. A device for Fast Fourier Transform (FFT), comprising: a data receiver, a data storage memory, a FFT unit, and a data output; said device also comprising a memory address translation unit and a data extraction unit;
said data receiver module being configured to: receive input data;
said address translation unit being configured to: duplicate M/N copies of received data and sending the copies to the data storage memory;
said data storage memory being configured to: store the received data sent from the memory address translation unit to M/N different addresses of the memory;

said FFT unit being configured to: perform M-point FFT on stored data;

said data extraction unit is configured to: extract one point in every several points in transformed data and sending extracted data to the data output;

said data output is configured to: output the received data;

said M being a maximum number of points in the FFT, and N being a practical number of points in the input data;

thereby, multiplexing of the FFT being completed; wherein $M=2^{n+j}$, $N=2^n$, n is a natural number greater than 0, j=0, 1, 2, M and N are integers.

8. The device of claim 7, wherein, said device also comprises a judgment unit, and said judgment unit is configured to: after receiving data sent from the data receiver, judge whether to perform M-point FFT or not, and if yes, send the data to the storage memory, otherwise, send the data to the memory address translation unit.

9. The device of claim 7, wherein, said data storage memory is configured to: when M=2N, store duplicated $i^{th}$ data to the memory addresses i and N+i respectively; wherein i is a natural number, $0 \leq i \leq N-1$;

or, said data storage memory is configured to: when M=4N, store the duplicated $i^{th}$ data to the memory addresses i, N+i, 2N+i, and 3N+i respectively; wherein i is a natural number, $0 \leq i \leq N-1$.

10. The device of claim 9, wherein, said data extraction unit is configured to: when M=2N, extract $(2i)^{th}$ data or $(2i+1)^{th}$ data, where $0 \leq i \leq N-1$;

or, said data extraction unit is configured to: when M=4N, extract $(4i)^{th}$ data, or $(4i+1)^{th}$ data, or $(4i+2)^{th}$ data or $(4i+3)^{th}$ data, where $0 \leq i \leq N-1$.

* * * * *